Patented May 22, 1934

1,959,658

UNITED STATES PATENT OFFICE 1,959,658

INSULATING CEMENT

Horace N. Clark, Bound Brook, N. J.

No Drawing. Application November 30, 1931,
Serial No. 578,220

4 Claims. (Cl. 106—18)

My invention relates to cement of the heat insulating type containing a predominant proportion of fibrous material, such as, rock wool or asbestos, for example, the cement set forth in my application Serial No. 507,304, and constitutes an improvement in these particular cements. The improvement consists in the addition to such cements of substances which will increase the covering capacity of their cement at least 25 percent on a dry basis, increase their insulating value, eliminate whatever shrinkage might take place in the drying of such cements and decrease the time of drying.

It has already been proposed in the prior art, for example, in Patent No. 1,087,098, to Aylsworth et al. to increase the volume and porosity of molded blocks of cementitious material by adding to the plastic material a metal such as aluminium, magnesium or zinc, capable of generating hydrogen by contact with alkaline hydroxides, and an alkaline hydroxide. The gas resulting from the reaction of the metallic powder with the alkaline hydroxide is entrapped in the cementitious material during the molding and thereby increases its volume. The cementitious material to which this procedure has been applied hitherto, however, has always been of a relatively high density, such as, Portland cement, so that the generated gas can be easily entrapped in the cementitious body.

It is to be presumed, however, that if the cement had a low density and contained a predominant proportion of fibrous material, the same effect would not be produced by the addition of gas generating substances for the reason that the lightness and porosity of the cement would not offer much resistance to the escape of the gas whereby the cement would not swell. This would seem to be especially true where the cement is applied in layers to a substratum, since, even with the cements of higher density, the decreasing of the depth of and the increasing of the surface of the body of cement would either reduce the effect of the generated gas to a minimum or nullify it entirely. In fact, the cements to which these gas generating substances have hitherto been applied, could not be applied to surfaces of the nature of those to which the cements covered by my invention are applied, even in the absence of gas generating substances.

I have found, however, that if a small quantity of aluminium or other metal powder capable of generating a gas by reaction with an alkaline hydroxide is added to a cement containing a predominant proportion of fibrous material, such as, that set forth in my aforesaid copending application, together with a predetermined quantity of alkaline hydroxide, the covering capacity of that cement will be increased by approximately, at least, 25 percent calculated on a dry basis and in some cases up to 50 percent.

It is customary in applying insulating cements to surfaces which are to be subjected to heat to follow the procedure which may be referred to as "spot" application. This procedure consists in projecting blobs of the cement against the surface in such a way as to form spots of the desired thickness. A sufficient amount of these spots are applied to the surface to cover the same without overlapping each other. The spots are then allowed to dry and the interstices are filled up with the cement so as to give a coating of uniform thickness. The purpose of the spots is to form a foundation for the layer of cement. If the entire layer were applied at once, it would fall away from the surface of its own weight, such surfaces usually being perpendicular. With the ordinary cement, these spots upon drying tend to shrink whereby the edges curl away from the substratum. When this happens, it is a very easy matter to peel off the spots and considerable difficulty is sometimes encountered by the peeling of the spots due to the curling up of the edges thereof. The improved cement according to my invention, however, is not open to this objection for the reason that after the spots are applied to the substratum, the reaction between the alkaline hydroxide and metallic powder takes place, causing the spots to swell. The swelling of each individual spot tends to force the edges of that spot more closely against the substratum thereby eliminating entirely the curling of the edges away from the substratum. In order to obtain a spot of a given area, it is only necessary to apply about three-fourths or even as low as one-half as much of my improved cement as is required of the cements known to the prior art. The swelling which takes place in my cement after its application to the surface imparts a depth to the spot at least equal to the depth of spots obtained by using 35 to 50 percent more of cements hitherto known.

I have further found that the addition of these gas generating substances considerably facilitates the drying of the cement on the substratum without the application of artificial heat. Moreover, the layer of cement so formed has a much higher insulating value than the cement to which no gas generating substances have been added.

I prefer to use aluminium powder as the gas generating metal powder and slaked lime as the alkaline hydroxide. In the event that caustic soda is used as the alkaline hydroxide, it is necessary to apply the cement to the substratum within a half hour after water is added and the cement is mixed since otherwise the beneficial effect would be nullified to a large extent.

The aluminium powder and slaked lime can be added to the composition in a dry state before shipment or storage or can be added to the composition at the time of mixing with water for application. Where caustic soda or potash are used as the alkaline hydroxide, it is preferable to add them at the time of mixing with water, just prior to application to the substratum. Generally speaking, the quantity of aluminium powder used varies from one-eighth to one percent of the total cementitious mixture and the slaked lime can be used in quantities up to five percent. Where caustic soda is used as the alkaline hydroxide, it is used in quantities up to two percent. The best results are obtained by using one-fourth percent aluminium powder and two percent of slaked lime, the remainder of the cement being made up of fibrous material and a binding agent with, if desired, a quantity of light earth, such as, diatomaceous earth, said cement being, preferably, of substantially the same composition as that set forth in my aforesaid copending application. The preferred composition is as follows:

| | Percent |
|---|---|
| Mineral wool | 50 |
| Diatomaceous earth | 19¾ |
| Bentonite | 18 |
| Asbestos fibre | 10 |
| Slaked lime | 2 |
| Aluminium powder | ¼ |

These proportions can be varied to a certain extent within well defined limits without changing the nature of this particular cement. The mineral wool can be varied up to ten percent on either side of the proportions given above. This is also true of the diatomaceous earth. The asbestos, however, should not be decreased by more than five percent, although its proportions can be increased up to ten percent over that given.

As is the case with this particular cement without the gas generating substances, the quality of the cement is considerably improved if the mineral wool is oiled during its manufacture. The range of proportions of the several ingredients is the same as that used when gas generating substances are not employed, namely, forty-five to sixty-five percent of mineral wool, ten to thirty percent of diatomaceous earth, eleven to eighteen percent of bentonite and five to twenty percent of asbestos, the metallic powder and alkaline hydroxide being always added in the proportions stated above.

Having thus described my invention and having given an example of the preferred embodiment of the same, together with the operative range of the proportions of the ingredients of that particular embodiment, which embodiment, however, is to be taken as illustrative rather than limitative, what I claim as new and wish to secure by Letters Patent is:

1. A heat insulating cement adapted to be mixed with water consisting of a predominant proportion of mineral wool, a substantial amount of diatomaceous earth, a binding agent, a quantity of metallic powder, capable of reacting with an alkaline hydroxide to generate hydrogen, up to about one percent of the total mixture and a quantity of alkaline hydroxide up to about five percent of the total mixture depending upon the strength of the alkaline hydroxide.

2. A heat insulating cement adapted to be mixed with water consisting of a predominant proportion of mineral wool, a substantial amount of diatomaceous earth, bentonite, a quantity of metallic powder, capable of reacting with an alkaline hydroxide to generate hydrogen, up to about one percent of the total mixture and a quantity of alkaline hydroxide up to about five percent of the total mixture depending upon the strength of the alkaline hydroxide.

3. A heat insulating cement adapted to be mixed with water consisting of 45 to 65 parts of mineral wool, 10 to 30 parts of diatomaceous earth, 11 to 18 parts of bentonite, 5 to 20 parts of asbestos, a quantity of metallic powder, capable of reacting with an alkaline hydroxide to generate hydrogen, up to about one percent of the total mixture and a quantity of alkaline hydroxide up to five percent of the total mixture, depending upon the strength of the alkaline hydroxide.

4. A heat insulating cement adapted to be mixed with water consisting of 50 percent of mineral wool, about 19 percent of diatomaceous earth, 18 percent of bentonite, about 10 percent of asbestos fibre, one-fourth percent of aluminium powder and two percent of slaked lime.

HORACE N. CLARK.